United States Patent [19]

Riley, Jr.

[11] Patent Number: 4,560,177

[45] Date of Patent: Dec. 24, 1985

[54] CONTOURED SHAFT SEAL FOR HIGH PRESSURE APPLICATIONS

[75] Inventor: William M. Riley, Jr., Gurnee, Ill.

[73] Assignee: Chicago Rawhide Mfg. Co., Elgin, Ill.

[21] Appl. No.: 639,120

[22] Filed: Aug. 9, 1984

[51] Int. Cl.⁴ ............................................. F16J 15/32
[52] U.S. Cl. .................................. 277/134; 277/152; 277/153
[58] Field of Search .................. 277/27, 134, 152, 153

[56] References Cited

U.S. PATENT DOCUMENTS

| | | | |
|---|---|---|---|
| 2,804,325 | 8/1957 | Riesing | 277/134 |
| 3,913,925 | 10/1975 | Gyory | 277/134 |
| 3,923,315 | 12/1975 | Hadaway | 277/134 |
| 4,102,538 | 7/1978 | Bertin | 277/134 |
| 4,126,320 | 11/1978 | Pendleton | 277/152 |
| 4,254,960 | 3/1981 | Jelinek | 277/152 |
| 4,432,557 | 2/1984 | Drucktenhengst | 277/153 |
| 4,501,431 | 2/1985 | Peisker et al. | 277/134 |

*Primary Examiner*—Robert I. Smith
*Attorney, Agent, or Firm*—Lockwood, Alex, FitzGibbon & Cummings

[57] ABSTRACT

A fluid seal unit for high pressure sealing applications. The seal has a rigid casing and an annular elastomeric sealing lip body which includes a primary seal band contacting a shaft in sealing engagement when the fluid in the sealed region is under a first pressure. The air side surface of the lip body also has auxiliary sealing ribs and fluid retaining grooves of progressively increasing diameter. When the pressure in the sealed region increases, one or more additional ribs will contact the shaft to provide increased seal band contact area and to entrap additional fluid near the shaft.

11 Claims, 5 Drawing Figures

U.S. Patent   Dec. 24, 1985   Sheet 1 of 2   4,560,177
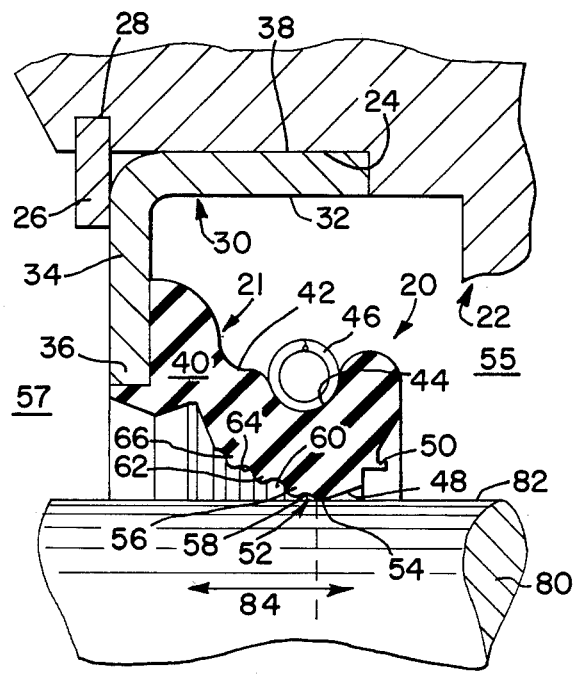
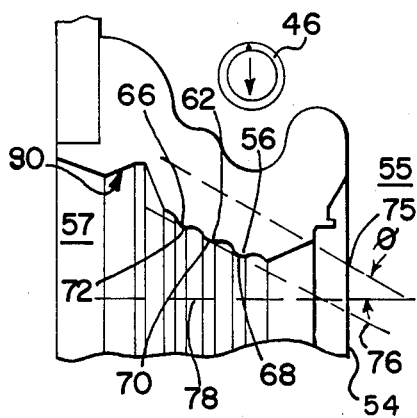 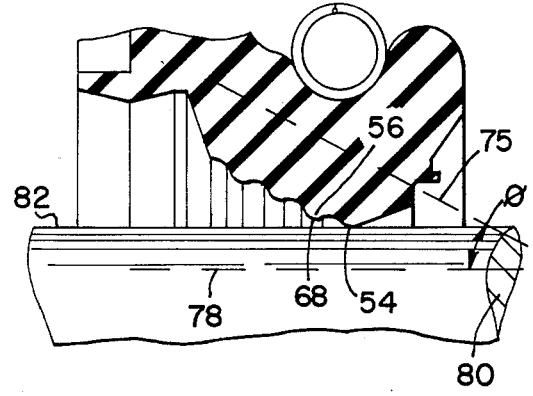

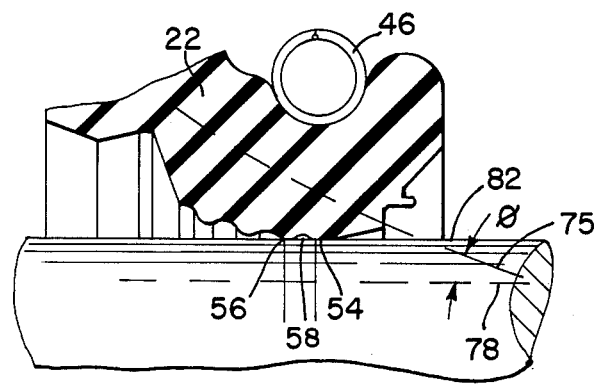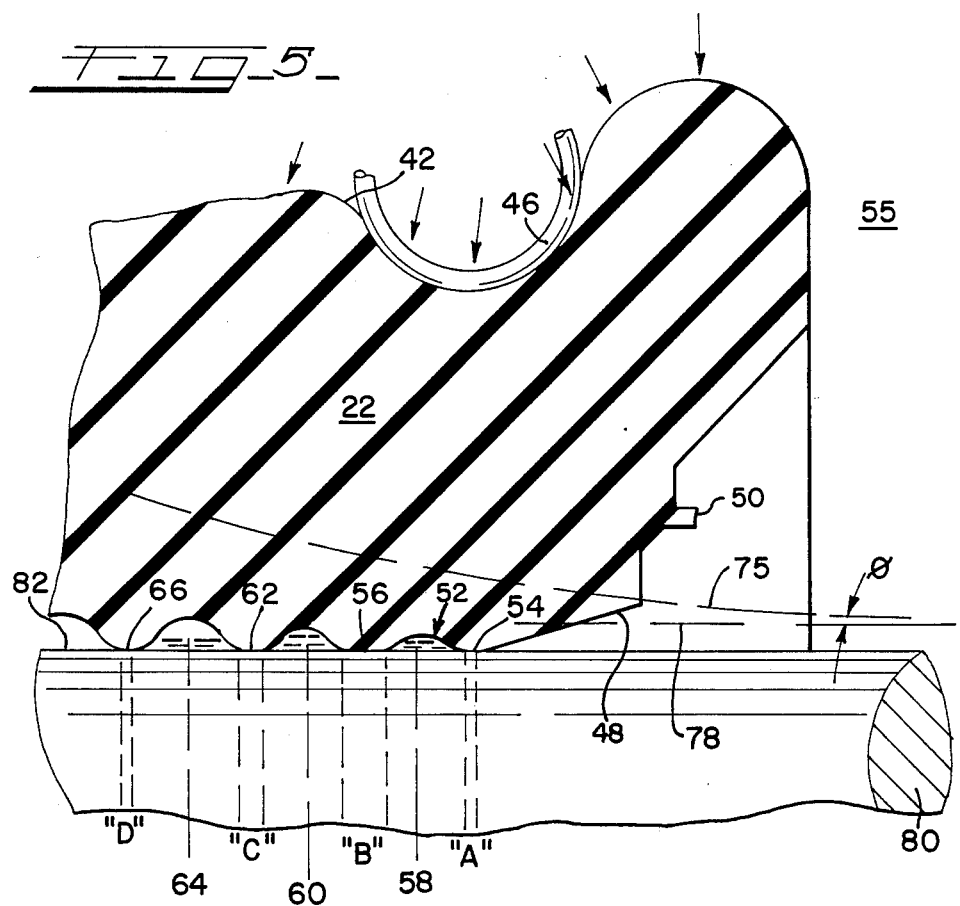

CONTOURED SHAFT SEAL FOR HIGH PRESSURE APPLICATIONS

BACKGROUND OF THE INVENTION

The present invention relates generally to fluid seals, and more particularly to seals adapted for use in high pressure environments, particularly those involving reciprocating or sliding motion of a sealed part axially through the seal opening.

While hydraulic pressure actuated mechanisms are becoming increasingly more common, and operate on familiar principles, recent applications of certain hydraulic mechanisms, such as automotive power steering units, for example, are often subject to operational conditions so severe as to tax prior known seal designs. For example, where mechanisms are becoming more compact and light weight, but still require application of substantially the same operating forces, certain parts of the sealed hydraulic mechanisms are exposed to increasingly higher pressures.

Other known mechanisms which are required to be operated at pressures of a given level are being subjected to more severe conditions by reason of increased rates or ranges of movements. These applications include rods and the like sealed by so called rod wiper type radial lip shaft seals. In these applications, the rod moves axially through an opening in the seal and the lip portion of the seal is exposed to fluid under pressure sometimes reaching or exceeding several hundred to over one thousand (1,000) pounds per square inch.

These applications can occasion severe wear in the seals themselves, in the sealed parts if there is insufficient lubrication, or leakage if there is insufficiently tight sealing in the sealed area. Every lubricated mechanism, including hydraulic mechanisms, is subject to catastrophic failure when leakage is such that the supply of lubricant or operating fluid is completely depleted.

Under the circumstances, there is a need for seals which undergo reduced wear and drag in respect to prior art seals, without suffering loss of sealing effectiveness.

According to the invention, an improved radial lip seal is provided which includes a lip portion having air and oil sides forming a seal lip body bonded to a radially inner portion of a seal casing, and wherein the so called air side of the seal lip is contoured so as to provide, in combination, a multi-lip sealing surface, controlled deflection under pressure, and excellent lubricant retention to provide improved performance in many applications.

In view of the failure of the prior art to provide seals capable of functioning at top performance levels in certain demanding environments, it is an object of the present invention to provide an improved high pressure fluid seal.

Another object of the invention is to provide a fluid seal having a contoured sealing lip adapted for use in high pressure environments.

Another object of the invention is to provide a fluid lip seal having a casing portion and a sealing lip body with relatively conventional oil side frustoconical lip surface meeting an air side surface which is contoured so as to provide plural sealing lips or ribs and annular, lubricant-retaining grooves therebetween Yet another object of the invention is to provide a high pressure radial shaft lip seal which includes a primary lip seal body having a primary seal band, a seal formed by the meeting of air and oil side frustoconical primary lip surfaces, and a plurality of auxiliary sealing ribs each separated from an adjacent rib by a circumferential groove, with the ribs having progressively increasing inside diameters so as to provide a sequential contact response on an associated shaft with an increase in pressure, to provide a gradually increasing seal "footprint" on the sealed shaft in the presence of increasing hydraulic pressures.

A still further object of the invention is to provide a high pressure seal having a primary seal lip and several auxiliary lips each adapted to engage a sealed part such as a reciprocable rod, and which further includes means for retaining fluid between such auxiliary lips for additional lubrication and reduced wear.

A still further object of the invention is to provide a composite elastomeric and metal seal which is adapted to provide reduced seal and sealed part wear in use.

Another object of the invention is to provide a seal which is capable of being used with or without auxiliary seal elements and which will assume in use an on-shaft profile adapted to reduce wear, retain lubricant, and reduce drag in use without sacrifice of sealing ability.

A still further object of the invention is to provide a seal which undergoes a gradual change of "barrel angle" in use as it encounters varying pressures in a sealed application.

The foregoing other objects are achieved in practice by providing a fluid seal having a seal casing and an elastomeric lip body bonded thereto, with the lip body being of annular form and including a frustoconical oil side surface meeting a frustoconical air side surface along a substantially circular, circumferentially extending seal band, and having its frustoconical air side surface further including a series of axially spaced apart ribs of smooth contour and gradually increasing inner diameters, spaced from each other by lubricant-retaining grooves, with the entire seal body being adapted to be urged into snug sealing engagement with an associated shaft by progressively increasing contact of said ribs with the sealed reciprocable shaft as the pressure in the sealed region increases.

The manner in which these and other objects and advantages to the invention are achieved in practice will become more clearly apparent when reference is made to the following detailed description of the invention set forth by way of example and shown in the accompanying drawings wherein like reference numbers indicate corresponding parts throughout.

BRIEF DESCRIPTION OF THE DRAWINGS

FIG. 1 is an enlarged fragmentary vertical sectional view of a seal made according to the invention.

FIG. 2 is a fragmentary view of the seal of FIG. 1, showing the position of certain elements thereof as formed;

FIG. 3 is a sectional view similar to that of FIG. 2 but further enlarged and showing the seal in an initial position of use;

FIG. 4 is a view similar to that of FIG. 3, and showing the same seal in a further position of use; and FIG. 5 is a further enlarged view showing the seal of the invention in a position of use under maximum pressure conditions.

DESCRIPTION OF THE PREFERRED EMBODIMENTS OF THE INVENTION

While the principles of the invention may be embodied in different forms and used in different applications, a description of a preferred form of seal will be given wherein the application is a power steering unit, wherein the seal is installed in a power steering housing which is to be pressurized and wherein the reciprocable member is the end portion of a rack from an automotive power steering rack and pinion gear arrangement.

Referring now to the drawings in greater detail, FIG. 1 shows a seal of the invention generally designated 20 to be installed in a housing generally designated 22 and to be retained in a counterbore 24 formed in the housing 22 and retained therein by a snap ring 26 or the like disposed within a locking ring groove 28.

The seal assembly 20 includes an elastomeric seal lip body portion generally designated 21, and a seal casing generally designated 30, and shown to include an axially extending annular casing flange 32, and a radially extending annular flange 34 terminating in a radially inner margin or seal body bonding portion 36.

The outside diameter 38 of the casing is received in fluid-tight relation within the seal housing counterbore 24; a secondary seal (not shown) such as a rubber outside diameter sleeve or other element may be used to achieve tight sealing in the counterbore. The seal body 21 includes a bonding portion 40, and includes an interior surface portion 42 which is exposed to the fluid retained in the sealed region, with such surface 42 including an annular spring groove 44 extending around the seal body in a known manner and adapted to receive a garter spring 46.

The seal also includes a generally frusto-conical oil side surface 48 lying radially inwardly of a so-called "pick trim" residue 50, with the oil side frustoconical surface 48 meeting an air side frustoconical surface 52 to form a seal band 54 having a generally circular locus. Lying on the air side of the seal and axially outwardly of the seal band 54 is a first auxiliary rib 56 separated from the seal band 54 by a circumferencial groove 58. A groove 60 lying axially and radially outwardly of the rib 56 provides a space between the rib 56 and a second auxiliary rib 62. In the preferred form, a still further groove 64 separates the second rib 62 from a third rib 66.

Referring now to FIG. 2, for example, it will be noted that the innermost surfaces 68, 70, 72, of the auxiliary ribs 56, 62, 66, are of gradually increasing diameter as they depart from or extend axially outwardly from the seal band 54. In this connection, the expression "axially outer" refers to being spaced away from the interior of the sealed region generally designated 55 in FIGS. 1 and 2, and lying towards the exterior or "air" side generally designated 57 in FIGS. 1 and 2.

"Radially outer" is self-explanatory, but is particularly meant to apply to an increasing diameter in an application wherein the sealed member passes through the center of the seal rather than around its outside, as would be the case in a radially outwardly acting lip seal.

Referring again to FIG. 2, it will noted that the inner surfaces 68, 70, 72, of the ribs 56, 62, 66, lie along and generally parallel to the major extent of the seal body shown by a dotted line and identified as 75 in FIG. 2. The counterpart line 76 in FIG. 2, which is tangent to the ribs, is seen to be substantially parallel thereto and is shown to make a given angle (theta) with an imaginary horizontal axis line 78 which extends parallel to the axis of the sealed member. In seal terminology, the angle of the air side portion of the seal lip body is often referred to as the "barrel angle". In the instant case, the barrel angle is that of the seal body as a whole, or that angle derived from the succession of points lying along the innermost respective diameters of the auxiliary ribs.

Referring again to FIG. 1, in the installation shown, the sealed member is a reciprocable rod portion 80 of a rack having an exterior surface portion 82 which meets the seal band 54 to form the primary seal. As shown by the arrows 84, the movement requiring a seal is an axial or traversing movement giving rise to a wiping type sealing action.

Referring now to FIG. 3, the relation of the angle between the lines 75, 76, and 78, is illustrated, as is the fact that, as installed, the innermost rib 56 may lie with its innermost surface 68 just spaced apart from the surface 82 of the sealed rod or shaft 80. Consequently, a slight so-called "residual interference" is provided between a primary seal band 54 and the shaft surface 82.

Referring now to FIG. 4, which is somewhat schematic in nature, it will be noted that the seal band 54 is in contact with the shaft surface 82, and that the first auxiliary rib 56 is also tangent to the surface and that the groove 52 between the primary seal band auxiliary rib 56 has flattened somewhat. In FIG. 4, which represents an installation under moderate pressure, the lines 75, 78 are now such that the angle is of reduced value as the seal body 22 is assuming a generally more cylindrical cross-section.

FIG. 5 illustrates schematically the seal 20 of the invention in its installed condition over a rod or shaft 80 wherein higher pressure within the sealed region 55 has caused the seal band 54 as well as all auxiliary ribs 56, 62 and 66, to contact the surface 82 of the shaft 80.

FIG. 5 also shows that, because of the hydraulic pressure exerted on the surface 42 of the seal body 22, as shown by the arrows, the entire body has deflected such that the angle is very small and the seal body as a whole closely overlies the shaft. Further, in this illustration the grooves 52, 60, 64 are shown to have accumulated a measurable amount of fluid therein and to retain this fluid for lubrication purposes; this advantageously diminishes wear especially under high pressure conditions. The width of the seal band 54 is schematically shown in FIG. 5 as "A", and the seal bands formed by the respective auxiliary ribs 56, 62, 66 are seen to be of progressingly decreasing widths "B", "C", and "D". Thus, the closest in or smallest diameter or auxiliary rib 56 is flattened down into a pattern "B" of considerable contact width with the associated shaft; the second auxiliary rib is also flattened into contact with the shaft, but provides a somewhat more narrow or reduced width seal band or "footprint" "C", and a definite but still further reduced width contact "D" is provided where the inside diameter 72 of the largest diameter or second auxiliary lip or rib 66 meets the shaft.

From the foregoing explanation, it will be apparent that as pressure increases, the shaft seal deforms down upon the shaft, but because of the unique flexing action, the contact pattern is of increased width and is provided by spaced apart ribs, each pair of which is able to retain lubricant between itself and its associated, spaced apart rib. While the amount of lubricant retained is not great, it is measurable and such lubricant is almost always present along the surface of a sealed shaft. In the absence of such grooves and ribs, it has been found that the high pressures encountered in these hydraulic sealing applications tend to extrude fluid from beneath the primary lip and to increase the sealing force beyond acceptable limits. This, in combination with lack of lubricant, has caused premature seal failure in prior art designs.

However, according to the present invention, the progressive action afforded by the seal of the invention is not only able to retain lubricant and prevent its extrusion from beneath these critical areas, but is able to distribute the load and do so progressively so that the requisite sealing forces are maintained, but tend to be distributed among more lips or ribs so as to avoid build-up of too much pressure or undue force localization.

Referring now to another feature of the invention, as may be seen by reference to FIGS. 1 and 2, a characteristic reverse tapered groove generally designed 90 may be provided to receive a locking insert or anti-extrusion member, such as a nylon ring of the type shown in U.S. Pat. No. 3,495,843. This washer may be retained in place by the inherent gripping action of the seal, or by an auxiliary locking ring as may be preferred in the particular application. Such auxiliary ring may be provided in a seal made according to the invention, but does not form an aspect of the invention which is novel per se.

It has been found that seals made according to the invention provide a greatly improved performance in use, increased reliability, decreased wear, and a concomitant ability to seal higher pressure encountered in problem applications of the type referred to herein.

It will thus be seen that the present invention provides an improved high pressure rod wiper seal having a number of advantages and characteristics, including those specifically pointed out and others which are inherent in the invention.

A preferred embodiment of the invention having been described by way of example, it is anticipated that variations of the described form of invention may occur to those skilled in the art, and that such variations may be made without departing from the spirit of the invention or the scope of the appended claims.

I claim:

1. A fluid seal unit for high pressure sealing applications, said seal unit comprising, in combination, an annular seal casing made from a relatively rigid material and adapted to be received in use within one element of a machine mechanism to be sealed, and an annular elastomeric sealing lip body having a portion thereof bonded to one margin of said annular casing, said lip body being defined at least in part by air and oil side frustoconical surfaces meeting each other along a substantially circular locus to form a primary seal band along which said sealing lip body, in use, will contact one other element of said machine mechanism in snug fluid-tight sealing engagement in the relaxed condition of said lip body when the fluid in the region of said machine mechanism is under a first pressure, said frustoconical air side surface of said lip body further including a plurality of auxiliary sealing ribs spaced axially apart from each other by fluid-retaining grooves, each of said auxiliary ribs having an area adapted to contact said other element and being sized so as to have progressively greater spacing from said other element in the direction away from said primary seal band, said seal body air side frustoconical surface being constructed and arranged such that, at said first pressure, the edges of said auxiliary ribs are spaced from said other element, and such that, as the pressure in said region increases, said seal body will be deflected radially such that the edges of additional ribs will contact said other element to provide increased seal band contact area and to entrap sealed fluid in said grooves lying between adjacent auxiliary ribs.

2. A fluid seal unit as defined in claim 1 in which said seal body further includes an annular spring groove generally radially aligned with a portion of said primary seal band, and a garter spring disposed within said groove.

3. A fluid seal unit as defined in claim 1 wherein said contact areas of said auxiliary ribs are of a smooth contour on the edges thereof which are adapted to contact said other element.

4. A fluid seal unit as defined in claim 1 which further includes an annular anti-extrusion element groove lying axially outwardly of said auxiliary ribs and at least partially axially inwardly of an edge of said seal casing, said anti-extrusion element groove being adapted to receive an insert element to prevent undue deflection of said seal body adjacent said casing margin.

5. A fluid seal unit as defined in claim 1 wherein said casing element is generally L-shaped in cross-section and includes an axial flange having a surface adapted for reception in a counterbore in said first machine element and a radial flange being at least one surface comprising said margin of said annular casing to which said seal lip body is bonded.

6. A fluid seal unit as defined in claim 1 wherein said one element of said mechanism lies radially outwardly of said other element, and wherein said auxiliary ribs are of gradually increasing inside diameter as they depart axially from said primary seal band area of said lip body.

7. A fluid seal unit as defined in claim 1 wherein said plurality of auxiliary ribs is at least three auxiliary ribs.

8. A sealed hydraulic mechanism comprising, in combination, a first machine element having disposed therein a shaft-receiving opening and a seal-receiving counterbore, and a second machine element in the form of a shaft extending through said opening, said mechanism further including a fluid seal which in turn includes an annular casing portion having a seal mounting flange portion received snugly within said counterbore and a seal body bonding portion, said seal further including an annular elastomeric seal body portion having at least one surface thereof bonded to said bonding portion, said seal body portion further comprising air and oil side frustoconical surfaces meeting each other along a substantially circular locus to form a primary seal band which, in the relaxed condition of said seal body, contacts said shaft in fluid-tight relation, said air side seal surface further including a plurality of axially spaced apart auxiliary sealing ribs each having an inner shaft contact surface and being spaced apart from an adjacent rib by at least one fluid-retaining groove, said shaft contact surfaces being of progressively increasing diameter in the direction away from said primary seal band, with said lip body being sufficiently flexible so that, upon increase of fluid pressure within said sealed region, said lip body will gradually deflect such that said contact surface progressively contacts said shaft surface, entrapping fluid within said grooves for enhanced lubrication of said shaft surface.

9. A sealed mechanism as defined in claim 8 wherein said seal body further includes a garter spring groove, and wherein garter spring is received within said groove.

10. A sealed mechanism as defined in claim 8 wherein said plurality of auxiliary ribs is at least three ribs.

11. A sealed mechanism as defined in claim 8 wherein said casing is of generally L-shaped cross-section.

* * * * *

UNITED STATES PATENT AND TRADEMARK OFFICE
CERTIFICATE OF CORRECTION

PATENT NO. : 4,560,177

DATED : December 24, 1985

INVENTOR(S) : William M. Riley, Jr.

It is certified that error appears in the above-identified patent and that said Letters Patent is hereby corrected as shown below:

Column 1, line 66, "." should be inserted after "there between"

Column 5, line 16, "designed" should be "designated"

Column 5, line 21, "," should be inserted after "ring"

Signed and Sealed this

Twenty-fourth Day of June 1986

[SEAL]

Attest:

DONALD J. QUIGG

Attesting Officer

Commissioner of Patents and Trademarks